(12) United States Patent
Su et al.

(10) Patent No.: US 7,033,057 B2
(45) Date of Patent: Apr. 25, 2006

(54) DIRECT TYPE BACKLIGHT UNIT OF LIQUID CRYSTAL DISPLAY

(75) Inventors: Yung-Mao Su, Hsinchu (TW); Chuan-Pei Yu, Yi Lan Hsien (TW)

(73) Assignee: AU Optronics Corp., Hsinchu (TW)

( * ) Notice: Subject to any disclaimer, the term of this patent is extended or adjusted under 35 U.S.C. 154(b) by 126 days.

(21) Appl. No.: 10/790,696

(22) Filed: Mar. 3, 2004

(65) Prior Publication Data

US 2004/0257794 A1 Dec. 23, 2004

(30) Foreign Application Priority Data

Jun. 17, 2003 (TW) ............................... 92116474 A

(51) Int. Cl.
*F21V 8/00* (2006.01)

(52) U.S. Cl. ............... 362/558; 362/560; 362/561; 362/330

(58) Field of Classification Search ............... 362/558, 362/560, 561, 625, 627, 227, 310, 343, 330, 362/511

See application file for complete search history.

(56) References Cited

U.S. PATENT DOCUMENTS

| 5,276,600 A | * | 1/1994 | Takase et al. ............... 362/320 |
| 5,377,084 A | * | 12/1994 | Kojima et al. .............. 362/618 |
| 5,384,658 A | * | 1/1995 | Ohtake et al. .............. 359/707 |

* cited by examiner

*Primary Examiner*—Sandra O'Shea
*Assistant Examiner*—Sharon Payne
(74) *Attorney, Agent, or Firm*—Troxell Law Office, PLLC

(57) ABSTRACT

A backlight unit for enhancing brightness of a TFT-LCD device is disclosed. The backlight unit comprises a plurality of lamp tubes, a diffuser plate and a reflector. The lamp tubes are disposed in the space encompassed by the diffuser plate and the reflector and are arranged with a selected interval. The diffuser plate is disposed above the lamp tubes for passing and diffusing the light emitted from said lamp tubes. The reflector plate is disposed beneath said lamp tubes for reflecting the light emitted from said lamp tubes back to said diffuser plate. The reflector plate has a plurality of particles fabricated thereon for scattering the reflected light uniformly.

10 Claims, 3 Drawing Sheets

DIRECT TYPE BACKLIGHT UNIT OF LIQUID CRYSTAL DISPLAY

FIELD OF THE INVENTION

The present invention relates to a backlight unit of a flat panel display (FPD) and, more specifically, to a direct backlight unit applied in thin film transistor liquid crystal displays for providing more uniform brightness.

BACKGROUND OF THE INVENTION

With the advance of techniques for manufacturing thin-film transistors, the liquid crystal displays (LCD) are widely applied in electrical products, such as PDAs, laptops, digital cameras, video cameras, cellphones, high resolution television sets, etc. due to advantages as smaller size, portability, non-radiation and lower power consumption. Especially when vast amounts of resources have been expended in researching and developing improved materials, processes and equipments to manufacture LCD devices, the qualities of the LCDs are promoted and costs thereof are reduced substantially. Notably, it is required to introduce backlight units into the LCDs for illumination because the liquid crystal molecules are non-illumination materials. Therefore the backlight unit is the most importance module for manufacturing the LCD devices, and the performance thereof is closely related to the displaying effect of the LCD.

Refer to FIG. 1, the backlight unit 1 applied to the current LCDs comprises an optical film 10, a diffuser plate 12, a reflective plate 14 and a plurality of lamp tubes 16. These lamp tubes 16 are disposed under the diffuser plate 12 with the selected interval. The light of the lamp tubes 16 illuminating into the diffuser plate 12 can be diffused more uniform and then emit upwardly through the upper surface of the diffuser plate 12.

For promoting the uniformity and brightness of the light in advance, on the diffuser plate 12 usually disposed is the aforementioned optical film 10. In general, the optical film 10, according to different functions, includes an upper diffuser film, a brightness enhanced film (BEF), and a lower diffuser film. The lower diffuser film is heavy misted to spread the light uniformly and to make the sharpness more smooth, while the brightness enhanced film is made of prizm or polarizer to aggregate light. As to the lightly misted upper diffuser film is applied to spread light uniformly and protect the films beneath from scrapes in later package procedures.

Besides, for preventing the light of the lamp tubes 16 from escaping downwardly, the reflector plate 14 is disposed under the lamp tubes 16 to reflect the light emitted downwardly, thereby promoting the light use efficiency. Namely, because the lamp tubes 16 are disposed in the space enclosed by the diffuser plate 12 and reflector plate 14, the light emitted out of lamp tubes can be accumulated onto the diffuser plate 12 entirely, so as to promote the illumination efficiency of the backlight unit 1.

It is noted that the current direct type backlight unit 1 has some drawbacks. Please refer to FIG. 1, the light emitted from the lamp tubes 16 are delivered along two directions mainly, the first direction is from the lamp tube 16 direct to the diffuser plate 12, and the second direction is from the lamp tube 16 to the reflector plate 14 and then reflecting back to the diffuser plate 12. Because the brightness is in inverse ratio to the distance, for the first direction, the lower surface of the diffuser plate 12 right above the lamp tube 16 will have the more bright light, while the other portions of the lower surface above the left and right sides of the lamp tube 16 will have the less bright light. As for the second direction, because the most reflected light from the reflector plate 14 is centralized on the surface of the diffuser plate 12 right above the lamp tube 16, the light brightness of the lower surface of the diffuser plate 12 will have light and shade contrast distinctly, thereby lowering the light uniform of the direct backlight unit 1.

Please refer to FIG. 2, the brightness diagram of the current direct type backlight unit 1 is measured. It is clearly illustrated the light brightness has the acute light and shade contrast with the distance. For example, the diffuser plate right above the lamp tube 16 has the more bright light of 9000 ANSI, while the diffuser plate between two adjacent lamp tubes 16 has the less bright light of 4000 ANSI. Under such condition, even introducing the diffuser plate 12 and the optical film 10, the whole illumination of the direct type backlight unit 1 is still not uniformly, thereby causing the screen appearance of the display have light and shade distinction.

For overcoming the issue of light spreading uniformly, in conventional techniques, a screen printing procedure is introduced to fabricate scattering dots on the diffuser plate 12 for enhancing light diffusing effect. However, it is required to perform an extra printing procedure on the diffuser plate 12, and also increase the production costs of the backlight unit 1. Besides, another solution, in the conventional techniques, is to increase the distance between the diffuser plate 12 and the lamp tube 16 for well uniforming the light emitted out of the lamp tube 16 to the diffuser plate 12. But this solution will cause the thickness of the backlight unit 1 increase so that the backlight unit manufactured can not satisfy the portable tide.

SUMMARY OF THE INVENTION

One objective of the present invention is to provide a direct type backlight unit for providing more uniform light.

Another objective of the present invention is to provide a method of enhancing light uniform of direct backlight units, by disposing particles on a reflector plate with different intervals for changing light angles and centralizing the reflected light to the dark areas of a diffuser plate, thereby promoting the light uniform of the diffuser plate.

Further an objective of the present invention is to provide a method of enhancing light uniform of direct backlight units, by disposing particles with different dimensions on a reflector plate for changing the light angles, thereby promoting the light uniform of the diffuser plate.

The present invention provides a direct type of backlight unit for FPD device. The backlight unit comprises a plurality of lamp tubes, a diffuser plate and a reflector. The lamp tubes are disposed in the space encompassed by the diffuser plate and the reflector and are arranged with a selected interval. The diffuser plate is disposed above the lamp tubes for passing and diffusing the light emitted from the lamp tubes. The reflector plate is disposed beneath the lamp tubes for reflecting the light emitted from the lamp tubes back to the diffuser plate. The reflector plate has a plurality of particles fabricated thereon for scattering the reflected light uniformly.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a direct type of backlight unit for TFT-LCD devices. The direct backlight unit has a plurality of lamp tubes distributed in the space encompassed by a diffuser plate and a reflector plate. By fabricating a plurality of particles with different intervals or/and different dimensions on the reflector plate, the scattering directions and quantities of the reflected light from the reflector plate can be changed and centralized to the dark areas of the diffuser plate, thereby enhancing the light distribution more uniformly of the direct backlight unit. The detailed description is given as following.

The First Embodiment

Figure 3:
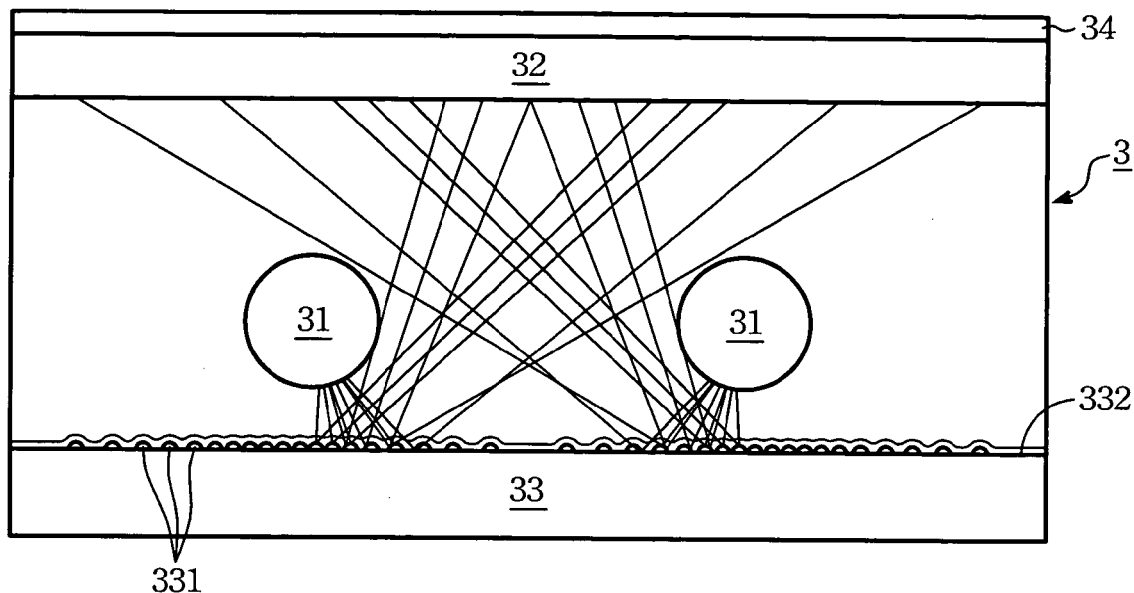
FIG. 3 is a cross sectional view of the direct type backlight unit in accordance with the first embodiment of the present invention.

Please refer to FIG. 3, the direct type backlight unit 3 for TFT-LCDs provided by the present invention is illustrated. As shown, the components of the direct type backlight unit 3 comprise a plurality of lamp tubes 31, a diffuser plate 32 and a reflector plate 33. The lamp tubes 31 are disposed in the space enclosed by the diffuser plate 32 and the reflector plate 33 and distributed transversely with a selected interval. The diffuser plate 32 is disposed above the lamp tubes 31 for diffusing the light emitted from the lamp tubes 31, thereby passing the uniform light upwardly from the upper surface of the diffuser plate 32. As to the reflector plate 33 is disposed below the lamp tubes 31 for reflecting the light scattered downwardly from the lamp tubes 31 upwardly to the diffuser plate 32.

On the reflector plate 33 a plurality of particles 331 are fabricated to change the directions of the reflected light for enhancing the light uniform of the backlight unit 3. It is noted that a portion of the particles 331 right under each one the lamp tube 31 are arranged closer together, while the other portion of the particles 331 distributed along the two lateral sides of the lamp tube are becoming farther apart, thereby scattering the reflected light nearby the lamp tube 31 to the lower surface of the diffuser plate 32 far apart the lamp tube 31 as possible, for the purpose of uniforming light. In other words, because the lower surfaces of the diffuser plate 32 between two lamp tubes 31 are usually the gloomy areas, adjusting the distribution density of the particles 331 can make the reflected light nearby the lamp tube 31 concentrate on the gloomy areas two sides of the lamp tube 31, for uniforming the light distribution on the whole diffuser plate 32.

In a preferred embodiment, the particles 331 are made of spherical dots with diameters of 5 to 100 micron. And a reflector coating layer is applied onto the reflector plate 33 for coating on the surfaces of the particles 331 so as to further promote the reflecting efficiency of the particles 331 and the reflector plate 33. In general, because the ultraviolet ray with the wavelength less than 400 nanometer will cause the material of the diffuser plate 32 become inferior, the material of the reflector coating layer 332 are preferably chosen from the group of aluminum, silver and alloy thereof, for reflecting the light with the wavelength of 400 to 700 nanometers only.

Besides, it is noted that the particles 331 are fabricated on the upper surface of the reflector plate 33 by performing the screen printing process or injection forming process. Though the particles 331 are made of spherical dots in above embodiment, however, in practice, the particles 331 can also be formed of hexagon or square dots.

For enhancing the illumination uniformity and brightness of the backlight unit 3, the optical film 34 constituted of several thin films can be applied onto the upper surface of the diffuser plate 32 for diffusing and brightening the illumination. In the preferred embodiment, the optical film 34 includes an upper diffuser film, a brightness enhanced film, and a lower diffuser film. The lower diffuser film is heavy misted to spread the light uniformly and to make the brightness and sharpness more smooth. In general, the brightness enhanced film is made of prizm or polarizer like dual brightness enhanced film (DBEF) to aggregate light. Relatively the upper diffuser film lightly misted is applied to protect the films beneath from scrapes in later package procedures for the most part. Also the upper diffuser film is applied to spread light uniformly.

Figure 1:
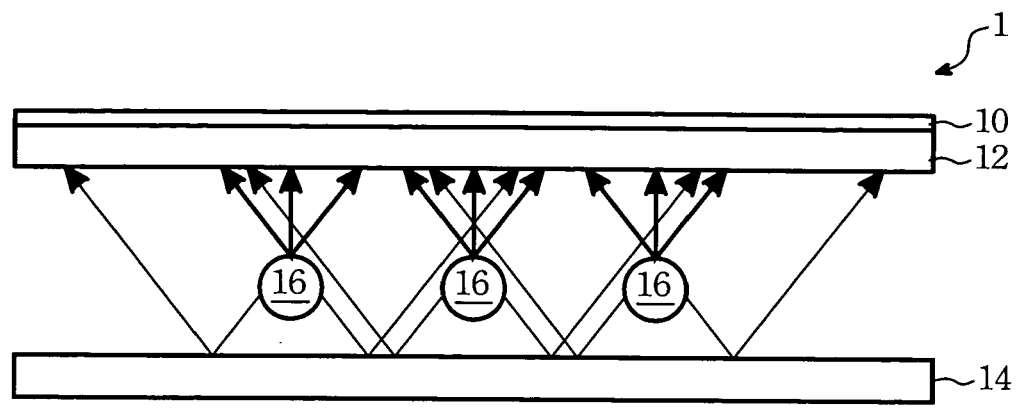
FIG. 1 is a cross sectional view of the direct type of backlight unit of flat plane displays in accordance with the prior art.
Figure 2:
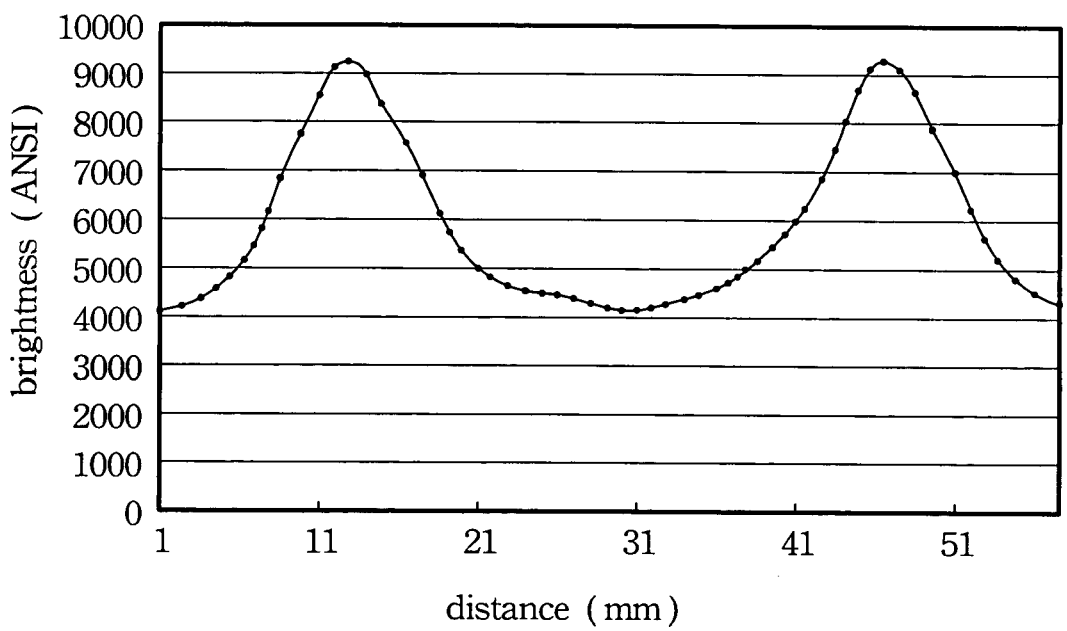
FIG. 2 is illustrating the light distribution in the direct backlight unit in accordance with the prior art.
Figure 4:
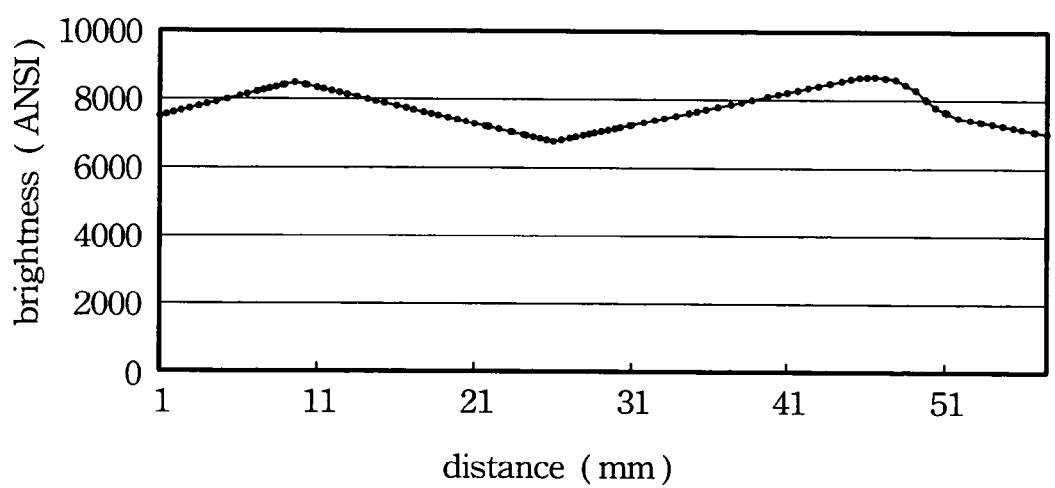
FIG. 4 is illustrating the light distribution in the direct type backlight unit in accordance with the first embodiment of the present invention.

Please refer to FIG. 4, illustrated is the measurement of the brightness distribution of the direct type of backlight unit 3 after introducing the reflector plate 33 with the particles 331. Apparently, even at different places of the backlight unit 3 the light distribution is still uniformly and the brightness is equal. For example, at the position right above the lamp tube 31 (the most bright area), the light brightness degree is about 9000 ANSI, while at the position between two adjacent lamp tubes 31 (the darkest area) the light brightness degree is about 7000 ANSI. In other words, comparing to the prior art (referring to FIG. 2), the backlight unit 3 provided by the present invention can reduce the brightness difference from the higher 5000 ANSI to 2000 ANSI to promote the uniformity of light distribution and have the appearance of picture well balanced.

The Second Embodiment

Figure 5:
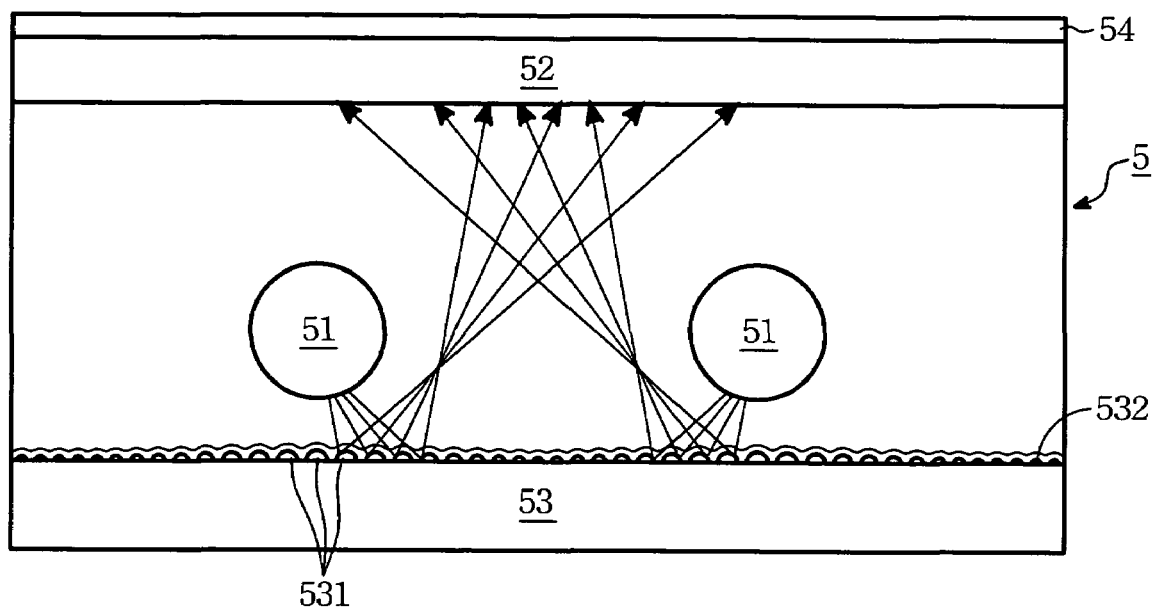
FIG. 5 is a cross sectional view of the direct type backlight unit in accordance with the second embodiment of the present invention.

Except adjusting the spacing of the particles 331 for changing the directions and quantities of the reflected light as described above, the dimensions of the particles 331 can also be adjusted to have the same effect. Please refer to FIG. 5, another direct type of backlight unit 5 of the present invention is shown. The direct type of backlight unit 5 comprises a plurality of lamp tubes 51, a diffuser plate 52 and a reflector plate 53. The diffuser plate 52 is disposed above the lamp tubes 51 for diffusing the light emitted from the lamp tubes 51 and passing the uniform light upwardly from the upper surface of the diffuser plate 52. As to the reflector plate 53 is disposed below the lamp tubes 51 for reflecting the light scattered downwardly from the lamp tubes 51 back to the diffuser plate 52.

On the reflector plate 53 a plurality of particles 531 are fabricated to change the directions of the reflected light for enhancing the light uniformity of the backlight unit 5. It is noted that the particles 531 right under each one the lamp tube 51 have large diameters, while the other particles 531 distributed along the two sides of the lamp tubes 51 have gradually decreasing diameters, for delivering the reflected light nearby the lamp tubes 51 to the lower surfaces of the diffuser plate 52 where are two sides of each lamp tube 51 to have light uniformity effect. In other words, the particles 531 right under the lamp tubes 51 have the most large diameter, while the other particles 531 right under the central area between two adjacent lamp tubes 51 have the smallest diameter. Further by adjusting the dimensions of the particles 531 the reflected light nearby the lamp tubes 51 can be concentrated to the gloomy areas two sides of the lamp tubes 51, for uniforming the illumination of the whole diffuser plate 52.

The particles 531 are made of spherical dots with about 5 to 100 microns. And for further promoting the reflecting efficiency, a reflector coating layer 532 is coated onto the surfaces of the reflector plate 53 and the particles 531 evenly. The reflector coating layer 532 is made of the material like aluminum, silver, alloy or other metal with higher reflecting rates, for reflecting the light with the wavelength of 400 to 700 nanometers only.

The particles 531 are fabricated on the upper surface of the reflector plate 53 by performing the screen printing process or injection forming process. Though the particles 531 are made of spherical dots in the embodiment, however, in practice, the particles 531 can also be formed of hexagon or square dots. Further, the particles 531 right under the lamp tube 51 have large dimensions, while the particles 531 distributed along two lateral sides of the lamp tube 51 have decreasing dimensions with the distance between the particles 531 and the adjacent lamp tube 51 for accumulating the reflected light to the lower surface of the diffuser plate 52 two sides of the lamp tube 51. Similarly, on the upper surfaces of the diffuser plate an optical film 54 constituted of an upper diffuser film, a brightness enhanced film, and a lower diffuser film, for providing the required scattering and diffusing effect.

Compared to the backlight unit in prior art, the backlight unit provided in the present invention has following advantages:

(1) By fabricating the particles with different dimensions or/and spacing the reflected light nearby the lamp tube can be centralized to the gloomy surface of the diffuser plate between two adjacent lamp tubes, for uniforming the illumination on the lower surface of the diffuser plate, so as to let the illuminant of the direct type backlight unit distribute more evenly.

(2) Because in the process of fabricating the backlight unit provided by the present invention, the particles are directly formed on the reflector plate by performing the surface treatment, the fabricating process of the present invention is more simple and quick than that of treating the diffuser plate in the prior art, and the cost is also reduced.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

What is claimed is:

1. A backlight unit comprising:
   a plurality of lamp tubes, arranged with a selected interval;
   a diffuser plate, disposed above said lamp tubes for passing and diffusing the light emitted from said lamp tubes; and
   a reflector plate, disposed beneath said lamp tubes for reflecting the light emitted from said lamp tubes back to said diffuser plate, wherein said reflector plate has a plurality of particles formed thereon for scattering the reflected light, wherein a portion of said particles right under each one said lamp tube is arranged closer together, while the other portion of said particles distributed along two lateral sides of said lamp tube is becoming farther apart.

2. The backlight unit of claim 1, wherein said particles are made of spherical dots with diameters of 5 to 100 micrometer.

3. The backlight unit of claim 1, further comprising a reflector coating layer applied onto said reflector plate for coating on surfaces of said particles so as to promote the reflecting efficiency.

4. The backlight unit of claim 3, wherein said reflector coating layer is applied to reflect the light with the wavelength of 400 to 700 nanometers.

5. The backlight unit of claim 3, wherein the material of said reflector coating layer is chosen from the group consisting of aluminum, silver and alloy thereof.

6. A backlight unit comprising:
   a plurality of lamp tubes, arranged with a selected interval;
   a diffuser plate, disposed above said lamp tubes for passing and diffusing the light emitted from said lamp tubes; and
   a reflector plate, disposed beneath said lamp tubes for reflecting the light emitted from said lamp tubes back to said diffuser plate, wherein said reflector plate has a plurality of particles formed thereon for scattering the reflected light, wherein a portion of said particles right under each one said lamp tube has larger diameters, while the other portion of said particles distributed along two lateral sides of said lamp tubes has gradually lesser diameters.

7. The backlight unit of claim 6, wherein said particles are made of spherical dots with diameters of 5 to 100 micrometer and distributed on said reflector plate uniformly.

8. The backlight unit of claim 7, wherein a portion of said spherical dots right under said lamp tubes have the most large diameter, while the other portion of said spherical dots right under the central area between two adjacent lamp tubes have the smallest diameter.

9. The backlight unit of claim 6, further comprising a reflector coating layer formed on said reflector plate for coating onto surfaces of said particles so as to promote the reflecting efficiency.

10. The backlight unit of claim 9, wherein said reflector coating layer is applied to reflect the light with the wavelength of 400 to 700 nanometers.

* * * * *